United States Patent [19]

Rosenquist

[11] Patent Number: 4,471,673
[45] Date of Patent: Sep. 18, 1984

[54] SHARPENING APPARATUS FOR CIRCULAR SAW BLADES

[75] Inventor: Roger K. Rosenquist, Rogers, Minn.

[73] Assignee: Foley Belsaw Company, Minneapolis, Minn.

[21] Appl. No.: 410,528

[22] Filed: Aug. 23, 1982

[51] Int. Cl.³ .......................................... B63D 63/14
[52] U.S. Cl. ........................................ 76/41; 76/79
[58] Field of Search .................. 76/37, 43, 41, 40, 42, 76/78 R, 79

[56] References Cited

U.S. PATENT DOCUMENTS

| | | | |
|---|---|---|---|
| 112,838 | 3/1871 | Otis | 76/43 |
| 599,114 | 2/1898 | Taylor et al. | 76/78 R |
| 1,551,230 | 8/1925 | Armstrong | 76/40 |
| 1,768,996 | 7/1930 | Ransom . | |
| 2,570,118 | 10/1951 | Hamberger . | |
| 2,764,043 | 9/1956 | Daggett | 76/43 |
| 2,808,743 | 10/1957 | Hamberger . | |
| 2,977,822 | 4/1961 | Hamberger et al. . | |
| 3,000,236 | 9/1961 | Lindheim | 76/43 |
| 3,313,185 | 4/1967 | Drake et al. . | |
| 3,766,806 | 10/1973 | Benner . | |
| 3,815,446 | 6/1974 | Murphy . | |
| 3,960,037 | 6/1976 | Stier . | |

FOREIGN PATENT DOCUMENTS

| | | | |
|---|---|---|---|
| 186160 | 7/1956 | Fed. Rep. of Germany | 76/41 |
| 314406 | 7/1956 | Switzerland | 76/41 |

OTHER PUBLICATIONS

Manual for Autool Grinder Model TCT/4BMC by Automatic Grinding Machine & Eng. Co. Ltd., Blackburn, England–Cover, Contents, Illustration list pages and pp. 15, 22–24, Dial Ind. Setting Clock Figure, Fig. 18, 26–30, 32–36, 38–39, Fig. 25, 41, 43, 45–56.

Primary Examiner—Roscoe V. Parker
Attorney, Agent, or Firm—Dorsey & Whitney

[57] ABSTRACT

A circular saw blade sharpening apparatus using a rotating grinder wheel has a base frame which includes an arcuate, planar adjusting table. An elongated positioning arm has one end rotatably connected to the adjusting table so that it rotates around a saw tip alignment axis located at the center point of the arc of the adjusting table. The other end of the arm rotates over the adjusting table. A saw holding fixture is mounted to move along the positioning arm and permits a saw blade to be mounted so that its tips will intersect the saw tip alignment axis. The grinder wheel is mounted for rotation around an axis parallel to the adjusting table. It can also be moved into and out of engagement with the saw tips to be sharpened.

10 Claims, 18 Drawing Figures

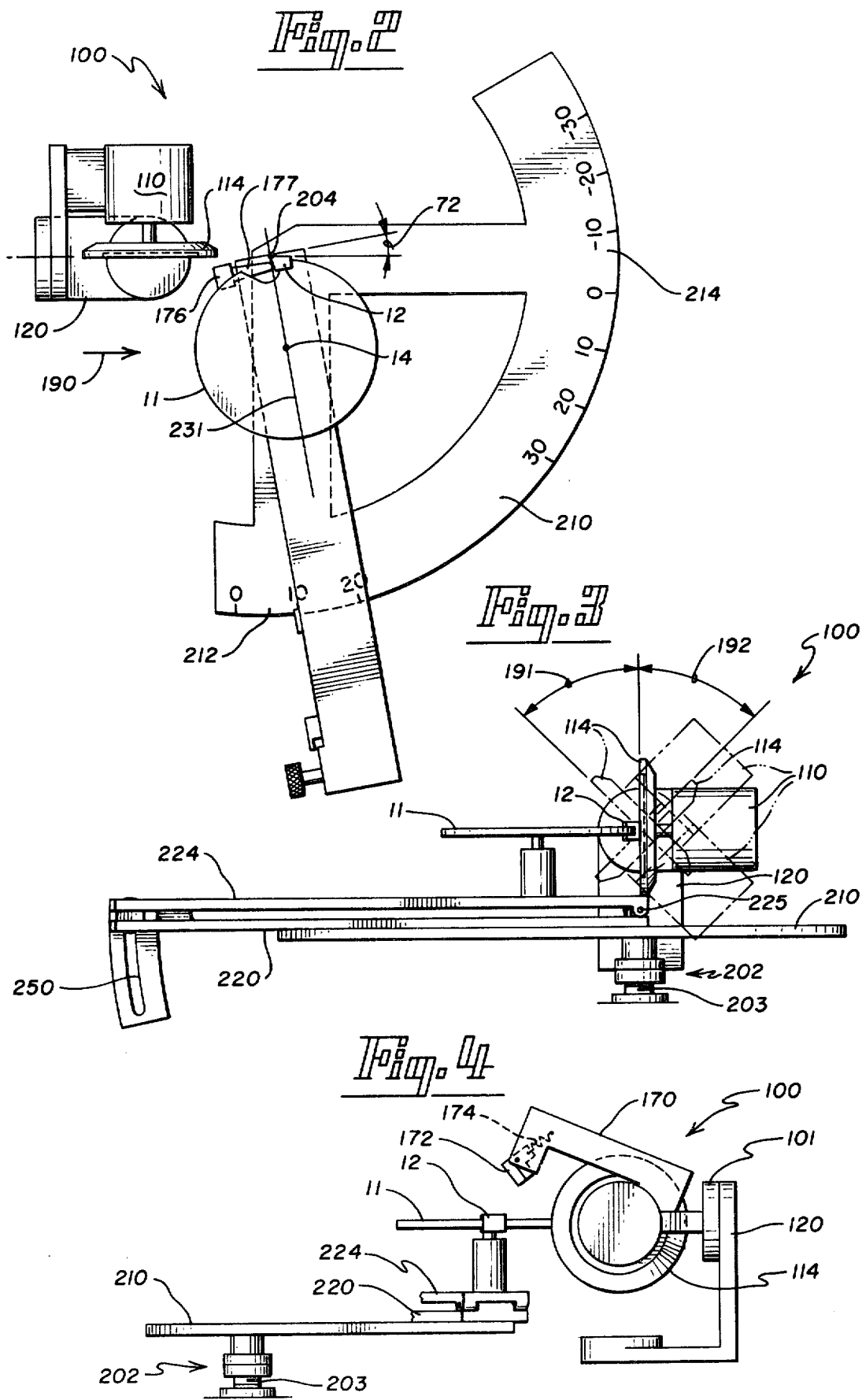

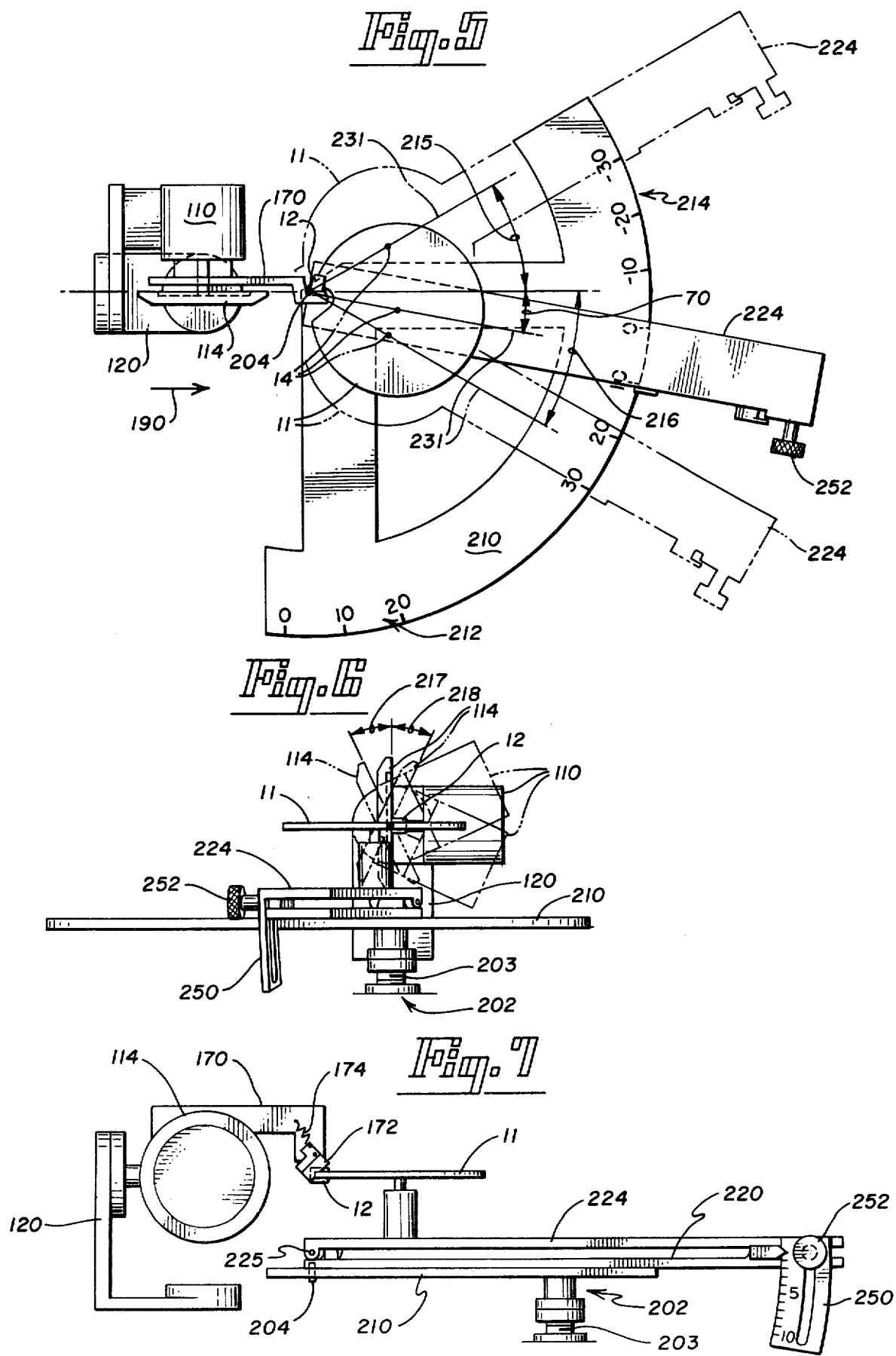

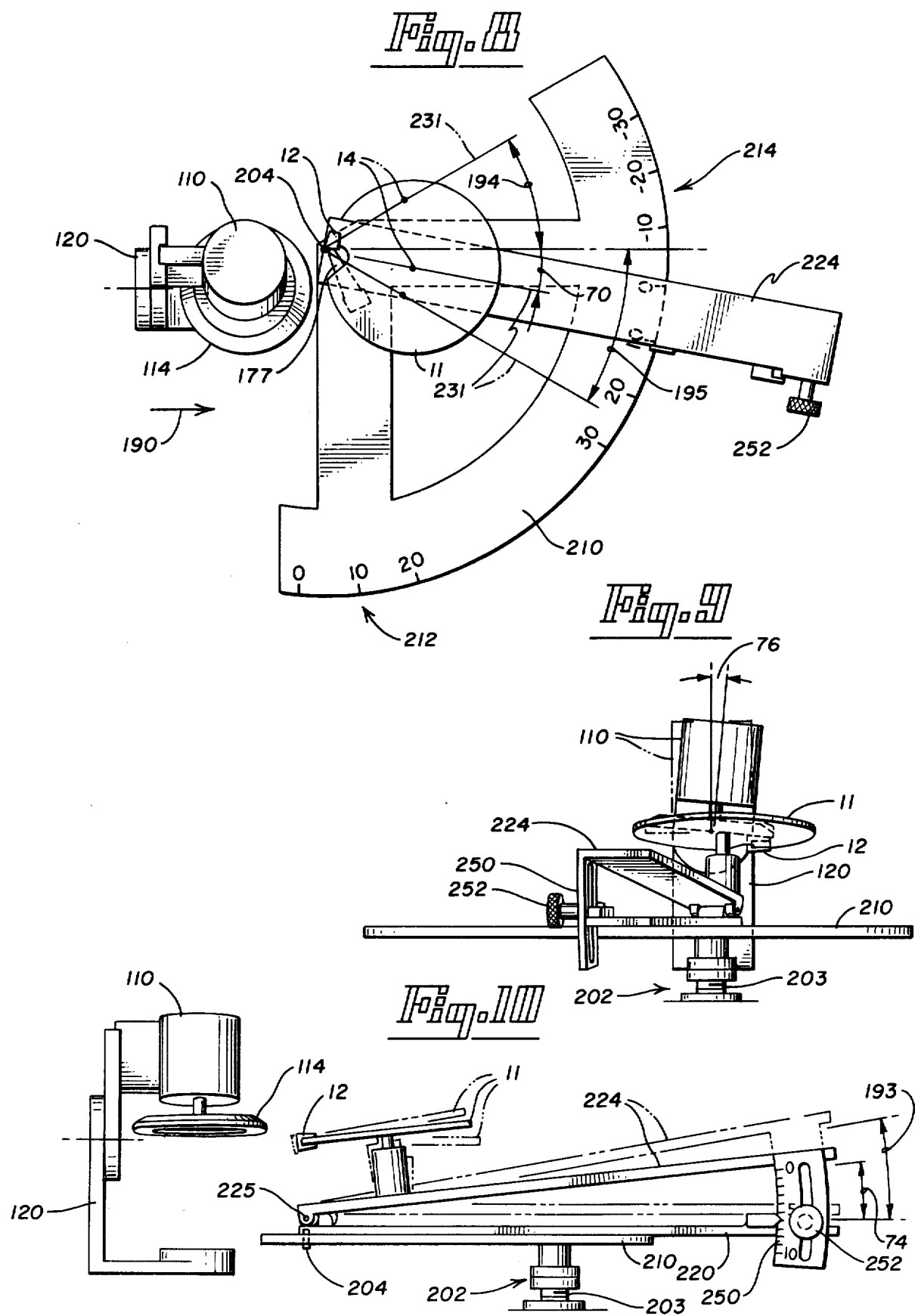

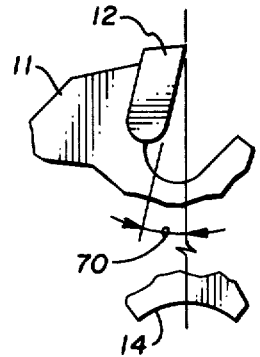
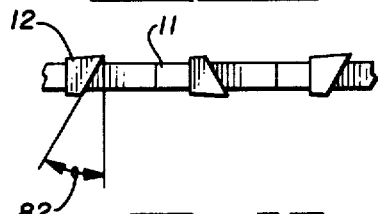
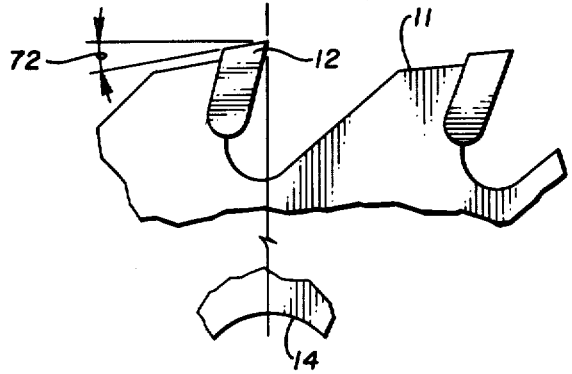
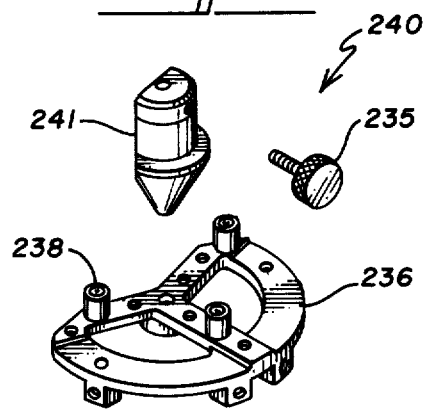
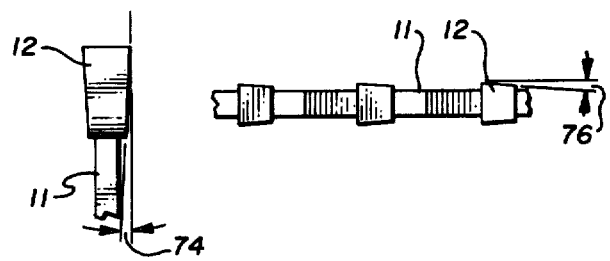
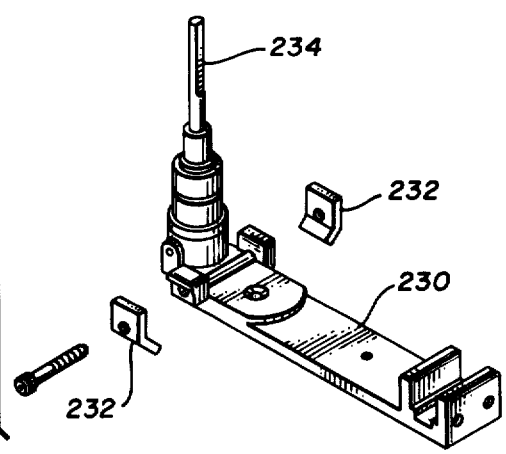
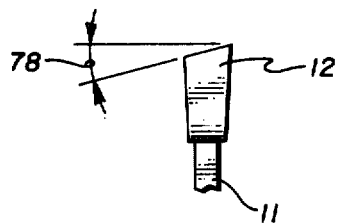
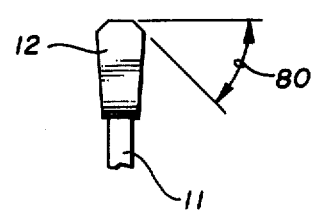

SHARPENING APPARATUS FOR CIRCULAR SAW BLADES

BACKGROUND OF THE INVENTION

1. Field of the Invention

This invention relates to an apparatus for sharpening saw blades. More particularly, this invention relates to an apparatus which uses a grinder wheel to sharpen the tips or teeth of circular saw blades.

2. Description of the Prior Art

Effective sharpening of circular saw blades, particularly carbide-tipped saw blades, requires that careful attention be paid to the geometry of the saw blade tips or teeth. Depending on the type of blade being sharpened, a variety of different grinding operations are required to restore sharpness. Almost all saw sharpening involves face grinding, which must be done in accordance with the saw's specified hook angle. A bevel angle may be used in face grinding. Sharpening also frequently involves top grinding, which must be done in accordance with the saw's specified top clearance angle. Grinding the top clearance angle may involve bevel angles and champfer or chip angles as well. For certain types of saws, side grinding is also done, in accordance with specified side clearance angles, which may be radial side clearance angles or tangential side clearance angles.

Several circular saw sharpening devices using grinding wheels are known in the prior art, including those shown in U.S. Pat. Nos. 1,768,996; 2,570,118; 2,808,743; 2,977,822; 3,313,185; 3,766,806; 3,815,446 and 3,960,037. A frequent disadvantage of prior art saw sharpening devices is that they are not versatile enough to permit all the different variations of face, top and side grinding which may be encountered. A further common disadvantage is that they are difficult to set up for the various types of grinding required. This is a matter both of ease and efficiency for the operator and a matter of accuracy. If an operator has difficulty seeing or setting up the angle relationships between the grinding wheel and the various surfaces of the saw tooth, grinds which accurately restore the desired angles will be difficult to achieve.

SUMMARY OF THE INVENTION

In accordance with the present invention, a circular saw blade sharpening apparatus of the type using a rotating grinding wheel has a base frame, including a planar angle adjusting table covering at least 90 consecutive degrees of arc around a center point. An elongated positioning arm has a first end which is rotatably connected to the adjusting table for rotation around a first, tip alignment axis located at the center point of the arc of the adjusting table, said first axis being perpendicular to the plane of the positioning arm. A second end of the arm is free to rotate over the adjusting table. A saw holding fixture is mounted for sliding movement along a longitudinal axis on the center line of said positioning arm, which intersects the first axis. The fixture holds a circular saw blade parallel to said arm and includes means for fastening said fixture at a point along the arm such that said first axis intersects a cutting tip at the periphery of a saw held by the fixture. Grinding wheel support and positioning means connected to the base frame is used to hold the grinding wheel in a base position in which its axis of rotation is parallel to the plane of the adjusting table and substantially in the plane of the saw. The support means permits the grinding wheel to be rotated about a second axis, which is perpendicular to the axis of grinding wheel rotation when the wheel is in its base position and parallel to the plane of the adjusting table and further permits the grinding wheel to be held in such rotated position. Grinding wheel translation means is used for moving the grinding wheel into and out of contact with the saw blade tips and across the saw tip surface to be ground.

A primary objective of the present invention is to provide a circular saw blade sharpening apparatus which permits face, top and side grinding, including bevels and champfers.

Another objective of the present invention is to provide a circular saw blade sharpening apparatus which is easy for an operator to set up for face, top and side grinding, because it permits simple and direct observation and setting of the grinding angles to be used.

A further objective of the present invention is to provide a circular saw blade sharpening apparatus which mounts the blade to be sharpened for adjustment of face and top grinding angles by rotation around an alignment axis which passes through the outermost point of blade tips.

These and other objectives of the invention will be apparent from a study of the following description of the preferred embodiment and the following figures.

BRIEF DESCRIPTION OF THE DRAWINGS

FIG. 2 is a top plan view of the invention in simplified form showing top clearance angle grinding setup.

FIG. 3 is a right side elevation of the invention in simplified form showing top clearance angle grinding adjustment for bevels and chips.

FIG. 4 is a partial rear elevation of the invention in simplified form showing top clearance angle grinding setup.

FIG. 5 is a top plan view of the invention in simplified form showing face grinding setup.

FIG. 6 is a right side elevation of the invention in simplified form showing face grinding adjustment for bevels.

FIG. 7 is a front elevation of the invention in simplified form showing face grinding setup.

FIG. 8 is a top plan view of the invention in simplified form showing radial and tangential side clearance grinding setup.

FIG. 9 is a right side elevation of the invention in simplified form showing radial and tangential side clearance grinding adjustments.

FIG. 10 is a front elevation of the invention in simplified form showing radial and tangential side clearance grinding adjustments.

FIGS. 11A-11B are plan views of a saw blade tip showing, respectively, a hook angle and a top clearance angle.

FIGS. 11C-11D are side views of a saw blade tip showing, respectively, a radial side clearance angle and a tangential side clearance angle.

FIGS. 11E-11F are side views of a saw blade tip showing, respectively, a top bevel angle and a champfer or chip angle.

FIG. 11G is a side view of a saw blade showing a face bevel angle.

FIG. 12 is an exploded perspective view of a portion of the saw blade holder assembly of the invention.

DESCRIPTION OF THE PREFERRED EMBODIMENT

Figure 1:
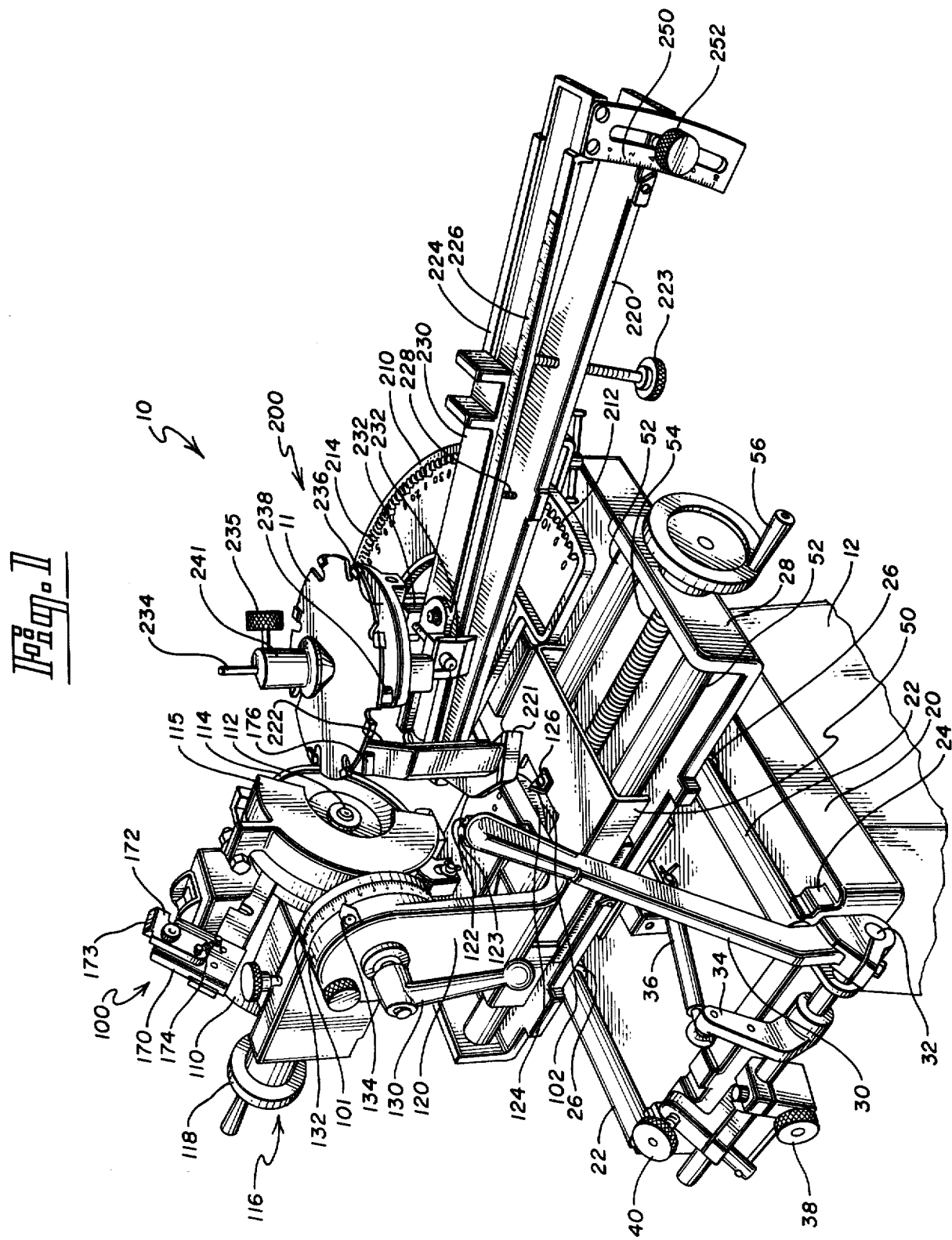
FIG. 1 is a perspective view of the invention.

Sharpening a circular saw blade can involve several different types of grinding operations. For carbide tipped saws, the grinding operations are performed on each of the carbide tips of the saw blade and on one or more of the tip's surfaces. The geometry of these surfaces varies according to the type of saw blade involved. One of the most important variables is the angle at which the various surfaces are ground.

In FIGS. 11A-11F, several views of a saw blade are shown, with various angles being identified. FIG. 11A shows a hook or rake angle 70, measured between the face of the tip 12 and a saw blade diameter line passing through the outermost point of the tip 12. FIG. 11B shows a top clearance angle 72, measured between the top surface of the tip 12 and a tangent line passing through the outermost point of the tip 12. FIG. 11C shows a side view of a tip 12 with a radial side clearance angle 74 indicated. FIG. 11D shows a side view of a saw blade 11 with a tangential side clearance angle 76 on a tip 12 indicated. FIG. 11E shows a side view of a tip 12 with a top bevel angle 78 indicated. FIG. 11F shows a side view of a tip 12 with a chamfer or chip angle 80 indicated. FIG. 11G shows a side view of an alternately beveled saw blade 11 with a face bevel angle 82 on a tip 12 indicated.

As best seen in FIG. 1, the invention 10 is an apparatus for sharpening circular saws, such as the saw blade 11. The base 20 of the invention 10 is mounted on a floor stand 12 which holds it at convenient working height for an operator. All the major components of the invention 10 are supported directly or indirectly by the base 20.

The grinder assembly 100 is movably supported on a grinder assembly saddle 50 having an inverted U-shaped cross section. The grinding assembly saddle 50 is mounted for sliding movement transversely above the base 20 on traverse rods 52. Positioning of the grinder assembly saddle 50 is determined and held by a saddle screw 54 passing through and cooperating with a corresponding saddle screw block (not shown) mounted underneath the grinder assembly saddle 50. A carriage handwheel 56 is used to turn the saddle screw 54.

The ends of the traverse rods 52 are supported between the ends of a feed carriage 28 having a U-shaped cross-section. The feed carriage 28 is mounted above the base 20 for longitudinal sliding movement on traverse rods 22, the ends of which are supported by rod stands 24. To permit free sliding movement, the feed carriage 28 is supported on bearings (not shown), held in bearing clamps 26.

Movement of the feed carriage 28 in a longitudinal direction above the base 20 is controlled by means of reciprocal movement of the feed handle 30 attached to feed shaft 32. The linkage between feed shaft 32 and feed carriage 28 is by means of a crank 34 and a connecting link 36. A backward travel stop 38 affixed to and rotating with the feed shaft 32 limits the amount of backward travel of the feed carriage 28 by butting up against the edge of the base 20. A forward travel stop 40 is used to limit forward travel of the feed carriage 28 by butting up against the upper edge of the base 20. Each of the back travel stop 38 and the forward travel stop 40 is adjustable on feed shaft 32 and includes a knurled knob attached to a threaded screw for fine adjustment.

The grinder assembly 100 is mounted on top of the grinder assembly saddle 50 by means of a motor support angle 120 which has short cylindrical extensions 101, 102 on its ends. The lower, horizontal portion of the motor support angle 120 is connected to the grinder assembly saddle 50 via a pivot stud 123 and a hex nut 122. The cylindrical extension 102 on the underside of the horizontal portion of the motor support angle 120 has a vertical axis scale 124 affixed thereon. A pointer 126 is used with the vertical axis scale 124 to indicate angular orientation of the grinder assembly 100 around its vertical axis.

The working portion of the grinder assembly 100 includes a motor 110 having a motor shaft 112 on which a diamond wheel 114 is mounted. The diamond wheel 114 may be reversed to have its grinding surface either facing the motor 110 or facing away from it. A wheel guard 115 surrounds a portion of the diamond wheel 114 for protection of the operator. The motor 110 is connected to the vertical portion of the motor support angle 120 via a motor feed assembly 116 controlled by a handwheel 118. Movement of the handwheel 118 moves the motor 110 back and forth in the direction of the axis of the motor shaft 112. At the connection point between the handwheel screw assembly 116 and the upper cylindrical extension 101 of the motor support angle 120, a locking handle 130 is used. The cylindrical mating surfaces of the motor feed assembly 116 and the upper cylindrical extension 101 of the motor support angle 120 form a means for determining the angular orientation of the grinder assembly 100 as it assumes various orientations around a horizontal axis passing through the locking handle 130. A horizontal axis scale 132 is wrapped around the cylindrical end of the handwheel screw assembly 116, while a pointer 134 is mounted on the mating cylindrical extension 101. In its base position, the grinding assembly 100 has the motor shaft 112 horizontal, corresponding to zero degrees on the horizontal axis scale 132.

A face grinding stop finger 172 is rotatably mounted with a bias spring 174 on an adjustable stop finger arm 170, which is attached to the housing of the motor 110, such that it can be swung away from the saw blade 11 (FIG. 1) or swung down to contact a tip 12 of the sawblade 11 (FIG. 7). A top grinding stop finger 176 is also used with the invention 10, but it is mounted on a stop finger base 222 which is part of the saw blade holder assembly 200.

The saw blade 11 is supported on a saw blade holder assembly 200 which is mounted to the base 20 on a blade centering stand 202 (see FIG. 3) located beneath the adjusting table 210. The blade centering stand 202 has a screw mechanism 203 making it adjustable to raise and lower the saw blade holder assembly 200. The adjusting table 210 is a planar member shaped somewhat like a portion of a protractor which, in the preferred embodiment, covers approximately 120 degrees of arc. The adjusting table 210 includes on its upper surface a top clearance scale 212 for adjusting top clearance angle grinding setups and a hook scale 214 for adjusting hook angles for face grinding setups.

A pivot bar 220 is mounted for rotation above the adjusting table 210 about a pin 204 (FIG. 7) at the center point of the arc of the adjusting table 210. The pivot bar 220 is roughly T-shaped, having a pivot bar cross-piece 221 at the end nearest the center point of the adjusting table 210. The pivot bar 220 can swing through approximately 120 degrees of arc, covering the full top clearance scale 212 and the full hook scale 214. Rotation of the pivot bar 220 around the center point of the adjusting table 210 defines a vertical tip alignment axis which (as will be explained in greater detail below) is of importance for proper positioning of a saw blade 11 for grinding. Attached to the pivot bar crosspiece 221 is a stop finger base 222 shaped somewhat like an inverted U, the legs of which are attached to the ends of the pivot bar cross-piece 221.

A slide bar 224 is attached to the pivot bar 220 by means of a pin 225 (FIG. 7) at the end where the pivot bar cross piece 221 is located. The manner in which the slide bar 224 is attached permits it to rotate around a horizontal axis which intersects with the vertical tip alignment axis. At the end of the slide bar 224 opposite the pivot bar cross piece 221, the slide bar 224 has a side scale 250 attached to it which cooperates with a side scale adjustment knob 252 to permit the slide bar 224 to be held at a specified angle to the pivot bar 220. The pivot bar 220 and the slide bar 224 together form a pivot arm assembly. As can be seen in FIG. 10, raising the slide bar 224 relative to the pivot bar 220 tilts the saw tip 12 away from the vertical tip alignment axis, but a line from the saw tip 12 drawn perpendicular to the slide bar 224 will still intersect the vertical tip alignment axis at pin 225.

Referring now also to FIG. 12, the saw blade 11 is supported by a cup and cone assembly 240 which is attached to an elongated bearing plate 230. The bearing plate 230 is slidably attached to the slide bar 224 and can be held in a fixed position relative to the slide bar 224 by means of opposing clamps 232 on either side of the slide bar 224. The longitudinal axis 231 (FIG. 2) along which the slide bar 224 may be moved intersects with the vertical tip alignment axis. The cup and cone assembly 240 has a cone stud 234 vertically attached to the bearing plate 230. The cone stud 234 passes up through the arbor hole 14 of the saw blade 11 and through a cone 241, which fits into the saw blade arbor hole 14. The saw blade 11 sits on three saw rest posts 238 on the upper surface of an arcuate bracket called the cup 236. The saw rest posts 238 define an approximately equilateral triangle through which the cone stud 234 passes. The saw blade 11 is centered on the cup 236 when the cone 241 slides down on the cone stud 234 to fit into the arbor hole 14 of the saw blade 11. A stud locking screw 235 is used to grip the cone stud 234 to hold the cone 241 firmly down against the saw blade 11. When the saw blade 11 is in position on the cup and cone assembly 240, its displacement from the vertical tip alignment axis can be adjusted and fixed by means of the clamps 232. The slide bar scale 226 is calibrated to measure distance from the vertical tip alignment axis and is used to aid in securing the proper displacement from this axis. Normally, a proper setting on the slide bar scale 226 is one-half the diameter of the saw blade 11.

OPERATION

To assist the operator of the invention 10 in obtaining accurate results for the various types of grinds involved in saw blade sharpening, the invention 10 needs to be properly set up and calibrated initially. This is done by insuring that the base 20 is horizontal, that the grinder assembly saddle 50 is horizontal, and that the adjusting table 210 mounted on the blade centering stand 202 is also horizontal. The grinder assembly 100 is positioned on the grinder assembly saddle 50 so that the plane of the grinding surface of the diamond wheel 114 intersects the vertical tip alignment axis when the motor shaft 112 is in its horizontal, base position. Proper horizontal set-up of the motor 110 is accomplished by means of the locking handle 130 (which is also used to mount the motor 110 at various angles to the horizontal for various special grinding tasks.) The pointers 126 and 134 are adjusted so that they read zero degrees, once proper alignment of the grinder assembly 100 is achieved.

The saw blade holder assembly 200 is set up initially by making the pivot bar 220 level and then making the slide bar 224 level, by means of a slide bar adjusting knob 223 and a set screw stop 228. Once this has been done, the side scale 250 can be positioned so that it reads zero degrees. The saw rest posts 238 are then adjusted to insure that the saw blade 11 lies horizontally, in a plane parallel to the plane of the slide bar 224 and perpendicular to the plane of the diamond wheel 114. A further adjustment is made in the blade centering stand 202 to raise and lower the entire saw blade holder assembly 200 such that the center line of the motor shaft 112 is approximately in the same plane as the center line of a saw blade 11.

For sharpening a saw blade 11 of a given thickness, the blade centering stand 202 must be adjusted so that the center line of the motor shaft 112 is exactly even with the center of the saw blade 11. For a particular saw blade, the position of the cup and cone assembly 240 must also be adjusted. To do this the diameter of the saw blade 11 is measured and divided by two to compute a displacement from the vertical tip alignment axis, which can be read on the slide bar scale 226. For sharpening a particular saw blade, certain adjustments should also be made to establish the appropriate amount of travel of the grinder assembly 100. Part of this adjustment involves setting the backward travel stop 38 and the forward travel stop 40 so that the diamond wheel 114 can traverse the entire face of the tip 12 of the saw blade 11 without moving too far into the gullet area. At the same time, the grinder assembly 100 must be able to back away from the tip 12 of the saw blade 11 far enough that the saw blade 11 can be rotated to the next tip. The face grinding stop finger arm 170 is adjusted so that the face grinding stop finger 172 extends to rest against the face of the tip 12 when the grinder assembly 100 is withdrawn. A fine adjustment of the face grinding stop finger 172 relative to the face of the grinding wheel 114 determines the extent of grinding which will occur on the face of the tip 12.

Once the machine has been properly set up for a given saw blade thickness and diameter, face, top and side grinding may be undertaken. Which of these operations is required varies according to the condition of the saw blade 11 which is being sharpened. If the saw blade 11 is to be sharpened without replacing any carbide tips 12, only face grinding and top grinding need be done. If some of the tips 12 are replaced, face grinding should be done followed by side grinding and top grinding. In the following, the basic steps for performing face, top and side grinding will be described, including grinding of bevel and champfer angles.

As best seen in FIGS. 1 and 5–7, to perform face grinding, the saw blade 11 is mounted horizontally using the cup 236 and the cone 241. The diamond wheel 114 is mounted with the face of the diamond wheel 114 towards the motor 110 and the face of the saw blade tip 12. Proper set up of the bearing plate 230 will have placed the circumference of the saw blade 11 so that the periphery of the saw blade 11 just intersects the vertical tip alignment axis. Thus (given reasonable blade roundness), the outermost point of each tip 12 will intersect this axis in turn as the saw blade 11 is rotated. Next, the face grinding stop finger 172 is dropped into position resting against the face to be ground, and centering of the saw blade relative to the motor shaft 112 is checked. The motor shaft 112 is kept horizontal, i.e., in the same plane as the center of the saw blade 11. Next, reference is made to the hook scale 214 to make the appropriate adjustment for hook angle. This can be done either by positioning the read-out edge of the pivot bar 220 at the appropriate angle on the hook scale 214 or by rotating the pivot bar 220 until the angle of attack of the diamond wheel 114 matches the existing face angle on the saw blade 11. The geometry of this can best be seen in FIG. 5, where a face angle of plus 10 degrees is shown as an example. (Phantom lines and the arcs 215, 216 show the possible range of plus or minus 30 degrees for hook angles. The size of these scales is determined by expected grinding requirements and could also be plus or minus 40 or 50 degrees, or might only accomodate positive angles.) The forward travel stop 40 and the backward travel stop 38 should, of course, have been adjusted so that the diamond wheel 114 will cover all of the face surface of the tip 12 while not grinding into the steel body of the saw blade 11. During grinding, moving the feed handle 30 from the backward travel stop 38 to the forward travel stop 40 in the direction of arrow 190 causes the diamond wheel 114 to traverse the face of the tip 12 while removing a small amount of metal, typically 0.002 inches, depending on adjustment of the face grinding stop finger 172 relative to the grinding face of the diamond wheel 114. As the diamond wheel 114 moves across the face, the face grinding stop finger 172 will rotate against its bias spring 174, moving upward against the gullet of the saw blade 11 as needed to permit the diamond wheel 114 to grind the entire face. The saw blade 11 may be rotated to grind the next tip by turning it clockwise as seen in FIG. 5. A bevel 173 on the stop finger 172 causes it to be driven up by the next tip before it snaps back down against the face of that tip.

If a bevel angle for the face of the tip 12 of the saw blade 11 is desired, the attack angle of the diamond wheel 114 must be adjusted. This is done by using the locking handle 130 to tilt the motor 110 so that the motor shaft 112 is no longer horizontal. See FIG. 6. The angle of adjustment, corresponding to the desired face bevel angle, is read on the horizontal axis scale 132. Bevel angles in either direction are possible; arcs 217, 218 show the range of adjustment normally used (approximately 25 degrees in either direction).

The appropriate set up steps for top grinding, including grinding of bevels or chip angles, are described with reference to FIGS. 1 and 2-4. Here again, the saw blade 11 is mounted horizontally using the cup 236 and the cone 241. The face grinding stop finger 172 is rotated out of the way as shown in FIG. 4 and a top grinding stop finger 176 is mounted on the stop finger base 222 (FIG. 1). The top grinding stop finger 176 has a spring-loaded tip 177 which rests against the face of the tip 12 to hold it in position during top grinding. As in the case of face grinding, the diameter of the saw blade 11 determines positioning of the bearing plate 230 along the slide bar 224. The diamond wheel 114 is reversed so that its grinding side faces away from the motor 110.

Once the saw blade 11 and stop finger 176 are in place, the pivot bar 220 is moved to choose the appropriate angle for top grinding. If the specifications for the saw are known, this angle can be selected on the top clearance scale 212. If not, the top clearance angle is selected by matching the angle of the top of the tip 12 to the diamond wheel 114. In FIG. 2 an example for a top clearance angle of ten degrees is shown. Again, the forward and backward travel stops 40, 38 are set so that the diamond wheel 114 covers all of the surface which is to be ground. The feed handle 30 is used to bring the grinding wheel 114 across the surface to be ground. The saw blade 11 may be rotated to grind the next tip by turning it clockwise as seen in FIG. 2. This causes the next tip to drive the spring-loaded tip 177 down momentarily before it snaps upward again to rest against the face of the next tip. In some instances where the tips 12 of the saw blade 11 are uneven and, thus, slightly out of round, the carriage handwheel 56 is used to adjust the grinding wheel 114 so that high tips are ground down even with the rest.

If bevel or chip angles are desired for top grinding, these can be obtained by adjusting the attack angle of the grinder assembly 100. As in the case of face grinding, this adjustment is made by reference to the horizontal axis scale 132, which states the angle of the motor shaft 112 relative to the horizontal. See FIG. 3, with arcs 191, 192 showing the usual range of adjustment (approximately 45 degrees in direction). For chip or champfer angles, grinding is similar to that for bevel angles, except that the diamond wheel 114 attacks only the chip portion of the tip, rather than the entire face. In some instances, the carriage handwheel 56 will need to be adjusted to bring the grinding wheel 114 into contact with the surface to be ground.

As best seen in FIGS. 8-10, the invention 10 can also be used for side clearance grinding, including both radial side clearance and tangential side clearance angles. For either type of grinding, the saw blade is again mounted horizontally using the cup 236 and the cone 241. The top grinding stop finger 176 is used. The diamond wheel 114 faces away from the motor 110. With the diamond wheel 114 vertical (zero degrees on horizontal axis scale 132) the pivot bar 220 is placed over the hook scale 214 and is positioned such that the face of the tip 12 is parallel with the grinding surface of diamond wheel 114, i.e., the scale is set for the saw's basic hook angle 70. (A hook angle of ten degrees is shown as example in FIG. 8. Arcs 194, 195 indicate other possible hook angles.) With the saw blade 11 in this position, a radial side clearance angle can be set-up by tilting the grinder assembly 100 up to 90 degrees on the horizontal scale 132 so that the motor 110 is above the saw blade 11 and the diamond wheel 114 is parallel to the saw blade 11. The desired radial side clearance angel 74 is then selected on the side scale 250, by loosening the side scale adjusting knob 252, raising the slide bar 224 relative to the pivot bar 220, and retightening the knob 252. See FIG. 10. Usually the angle chosen is between 1½ degrees and 6 degrees; arc 193 shows the maximum range of adjustment. At this point the carriage handwheel 56 is used to move the grinder assembly 100 towards the top clearance scale 214. Only a few inches movement is required, enough to avoid grinding a tip other than the one at the tip alignment axis. This offset appears in FIG. B.

The procedure for setting up a tangential side clearance angle 76 is best seen in FIG. 9. The angle of the grinder assembly 100 is adjusted so that the face of the diamond wheel 114 assumes the appropriate angle relative to the tip 12 of the saw blade 11. Usually the angle is between 3 degrees and 5 degrees; thus the angle reading on the horizontal axis scale 132 will be between 93 and 95 degrees.

Once the radial and tangential side clearance angles have been set up, grinding can commence, with both angles being ground simultaneously. The motor handwheel 118 of the motor feed assembly 116 is used to bring the diamond wheel 114 down onto the surface to be ground. The blade 11 is rotated clockwise as viewed in FIG. 8 to advance it to grind the next tooth. Once the side clearance angles have been ground on one side, the saw blade 11 should be turned over for grinding on the other side. However, before grinding on the other side is commenced, the pivot bar 220 should be moved on the hook scale 214 to a negative degree setting equal to the number of degrees on the positive scale used for grinding the other side. Also, the direction of the top grinding stop finger 176 must be reversed.

From the foregoing it is seen that the improved saw blade sharpening apparatus of the present invention uses a saw blade holder assembly 200 which permits the circumference of a saw blade 11 and the outermost point of each cutting tip 12 to be aligned with a vertical tip alignment axis. The assembly 200 also permits a pivot bar 220 to be rotated around this axis to align the top surface and the face of a saw blade 11 with a diamond wheel 114 to grind proper top clearance and hook angles. The geometry of the invention 10 keeps the tip 11 at the tip alignment axis regardless of the hook or top clearance angle selected and permits these angles to be readily observed and accurately set. Bevels and chip angles can also be ground by tilting the grinding assembly 100 so that the diamond wheel 114 attacks the saw blade at an angle other than a right angle relative to the plane of the saw blade 11. By adjusting the diamond wheel 114 so that it is parallel to the plane of the saw blade 11 and then tilting the slide bar 224 relative to the pivot bar 220, radial side clearance angles can also be ground. If the diamond wheel 114 is simultaneously tilted so that it forms a slight angle relative to the plane of the saw blade 11, tangential side clearance angles can also be ground. Again, for these types of grinds, the geometry of the invention 10 permits the various angles to be readily observed and accurately set.

While the preferred embodiment of the invention has been illustrated and described, it is to be understood that the invention is not limited to the precise construction herein disclosed, and the right is reserved to all changes and modifications coming within the scope of the invention as defined in the appended claims. In particular, it is clear that with only slight modification the saw blade holder assembly 200 could be mounted on a feed carriage and adjustable saddle (rather than having the grinder assembly 100 so mounted), such that the saw blade 11 could be driven into contact with the diamond wheel 114. What is needed is that a properly positioned saw blade 11 and a diamond wheel 114 be movable relative to each other.

Having thus described the invention, what is claimed as new and desired to be protected by Letters Patent is:

1. A circular saw blade sharpening apparatus of the type using a rotating grinding wheel comprising:
   (a) a base frame, including a planar angle adjusting table covering at least 90 consecutive degrees of arc around a center point;
   (b) an elongated positioning arm, having a first end which is rotatably connected to said adjusting table for rotation around a first positional axis located at said center point, said axis being perpendicular to the plane of said arm, and a second end which is free to rotate in a plane parallel to the adjusting table;
   (c) a saw holding fixture mounted for movement along a longitudinal axis of said positioning arm, which axis substantially intersects said first axis, said holding fixture being adapted to hold a circular saw blade parallel to said arm and perpendicular to said first axis, said holding fixture further including means for fastening said fixture at a point along said arm such that said first axis intersects the periphery of the saw blade held by said fixture;
   (d) grinding wheel support and positioning means for holding said grinding wheel in a base position in which its axis of rotation is parallel to the plane of the adjusting table and substantially in the plane of the saw and in which the plane of its grinding face coincides with the first positional axis, said support and positioning means further permitting the grinding wheel to be rotated to various rotational positions about a second positional axis which is perpendicular to the axis of grinding wheel rotation and parallel to the plane of the adjusting table and further permitting said grinding wheel to be held in such rotational positions; and
   (e) translation means connected to said base frame for moving the grinding wheel support and positioning means and the saw holding fixture relative to each other, said translation means permitting the grinding face of the grinding wheel to engage the face, top and side surfaces of a saw blade tip held on the saw holding fixture and further permitting the grinding face to traverse linearly across the face and top surfaces while remaining coincident with the first positional axis.

2. A circular saw blade sharpening apparatus of the type using a rotating grinding wheel comprising:
   (a) a base frame, including a planar angle adjusting table covering at least 90 consecutive degrees of arc around a center point;
   (b) an elongated positioning arm, having a first end which is rotatably connected to said adjusting table for rotation around a first positional axis located at said center point, said axis being perpendicular to the plane of said arm, and a second end which is free to rotate in a plane parallel to the adjusting table;
   (c) a saw holding fixture mounted for movement along a longitudinal axis of said positioning arm, which axis substantially intersects said first axis, said holding fixture being adapted to hold a circular saw blade parallel to said arm and perpendicular to said first axis, said holding fixture further including means for fastening said fixture at a point along said arm such that said first axis intersects the periphery of the saw blade held by said fixture;
   (d) grinding wheel support and positioning means for holding said grinding wheel in a base position in which its axis of rotation is parallel to the plane of the adjusting table and substantially in the plane of the saw, said support and positioning means further permitting the grinding wheel to be rotated to various rotational positions about a second positional axis which is perpendicular to the axis of grinding wheel rotation and parallel to the plane of the adjusting table and further permitting said grinding wheel to be held in such rotational positions; and (e) translation means connected to said base frame for moving the grinding wheel support and positioning means and the saw holding fixture relative to each other, said translation means permitting the grinding wheel to engage the face, top and side surfaces of a saw blade tip held on the saw holding fixture and wherein the translation means is connected to the grinding wheel support and positioning means and comprises means permitting the grinding wheel to be moved back and forth in the direction of the axis of grinding wheel rotation and also in a direction parallel to the plane of the grinding wheel and simultaneously parallel to the plane of the adjusting table, such that said grinding wheel is moved into and out of contact with the saw periphery and across saw blade surfaces to be sharpened.

3. A circular saw blade sharpening apparatus of the type using a rotating grinding wheel comprising:

(a) a base frame, including a planar angle adjusting table covering at least 90 consecutive degrees of arc around a center point;

(b) an elongated positioning arm, having a first end which is rotatably connected to said adjusting table for rotation around a first positional axis located at said center point said axis being perpendicular to the plane of said arm, and a second end which is free to rotate in a plane parallel to the adjusting table;

(c) a saw holding fixture mounted for movement along a longitudinal axis of said positioning arm, which axis substantially intersects said first axis, said holding fixture being adapted to hold a circular saw blade parallel to said arm and perpendicular to said first axis, said holding fixture further including means for fastening said fixture at a point along said arm such that said first axis intersects the periphery of the saw blade held by said fixture;

(d) grinding wheel support and positioning means for holding said grinding wheel in a base position in which its axis of rotation is parallel to the plane of the adjusting table and substantially in the plane of the saw, said support and positioning means further permitting the grinding wheel to be rotated to various rotational positions about a second positional axis which is perpendicular to the axis of grinding wheel rotation and parallel to the plane of the adjusting table and further permitting said grinding wheel to be held in such rotational positions;

(e) translation means connected to said base frame for moving the grinding wheel support and positioning means and the saw holding fixture relative to each other, said translation means permitting the grinding wheel to engage the face, top and side surfaces of a saw blade tip held on the saw holding fixture; and (f) wherein the positioning arm comprises an elongated tilting member to which the saw holding fixture is attached, said member being mounted for rotational movement through a small arc about a third positional axis which is substantially parallel to the plane of the adjusting table and perpendicular to the longitudinal axis along which the saw holding fixture moves, whereby tilting said member and the saw holding fixture permits grinding of radial top clearance angles.

4. The sharpening apparatus recited in claim 1, wherein the positioning arm has an elongated groove in the direction of its longitudinal axis and the saw holding fixture is adapted to be slidable and fixable along the longitudinal groove.

5. The sharpening apparatus recited in claim 4, wherein the means for fastening the fixture comprises opposed clamps for clamping against opposite sides of the positioning arm.

6. The sharpening apparatus recited in claim 1, wherein the saw holding fixture comprises:

a planar bracket having three saw rest posts projecting from it on which a saw blade may rest, said rest posts being positioned approximately at the corners of an equilateral triangle;

a stud parallel to the rest posts extending through a hole in the planar bracket which is enclosed within said equilateral triangle; and a cone having a central bore from its tip to the center of its base, said bore being threadable on said stud with the tip of the cone pointing in the direction of the planar bracket such that the cone fits into the arbor hole of a saw blade placed on said rest posts with the stud extending through the arbor hole, whereby the saw blade is centered about the stud.

7. The sharpening apparatus recited in claim 1, wherein the adjusting table covers approximately 120 consecutive degrees of arc around a center point.

8. The sharpening apparatus recited in claim 1, wherein the adjusting table is marked with a hook angle scale and a top clearance angle scale, each of which cooperates with the positioning arm so that the position of the positioning arm relative to either scale can be used to select or to register a desired hook angle or top clearance angle.

9. The sharpening apparatus recited in claim 2, wherein the motion of the grinding wheel back and forth in the direction of the plane of the grinding wheel and simultaneously parallel to the plane of the adjusting table is limited by a backward stop and a forward stop.

10. The sharpening apparatus recited in claim 1, further comprising a spring loaded stop finger located under the saw blade and extending upward to rest against the face of a saw blade tip, said spring loaded stop finger being deflected downward by rotation of the saw blade to the next tip before springing back up to rest against the face of the next tip.

* * * * *